United States Patent [19]

Golumbic

[11] 4,013,495
[45] Mar. 22, 1977

[54] METHOD FOR REPAIRING PIGMENTED AND TEXTURED FLEXIBLE MATERIALS

[75] Inventor: Harvey J. Golumbic, Fullerton, Calif.

[73] Assignee: Vinyl-Chem International, Inc., Glendale, Calif.

[22] Filed: Sept. 17, 1975

[21] Appl. No.: 614,130

[52] U.S. Cl. .................. 156/98; 156/209; 156/256; 264/36; 427/140; 427/262

[51] Int. Cl.$^2$ ..................... B32B 35/00

[58] Field of Search ......... 156/94, 98, 209, 256; 427/140, 262; 264/36

[56] References Cited

UNITED STATES PATENTS

| | | | |
|---|---|---|---|
| 2,855,338 | 10/1958 | Mulkey | 156/94 |
| 3,271,217 | 9/1966 | Mapson | 156/98 |
| 3,620,865 | 11/1971 | Golumbic | 156/98 |
| 3,713,926 | 1/1973 | Speer | 156/98 |
| 3,772,114 | 11/1973 | Kowalchuk | 156/98 |
| 3,804,685 | 4/1974 | Jacoby et al. | 156/98 |

Primary Examiner—Edward G. Whitby
Attorney, Agent, or Firm—Christie, Parker & Hale

[57] ABSTRACT

The edge of a hole in base vinyl material is cut clean and sharp and the material bounding the hole cleaned. A liquid vinyl compound is layered into the hole with each layer cured after it is applied. Only the last layer is pigmented to match the color of the base material. The exposed surface of the final layer is blended with the base material to present a continuous, uninterrupted surface. A hard, flexible and clear graining tool obtained from an impression of the base material is applied to the upper surface of the welding compound and indexed with the grained pattern of the vinyl base material after the cured welding compound and surrounding base material have been heated sufficiently to receive the grain impression.

10 Claims, 3 Drawing Figures

METHOD FOR REPAIRING PIGMENTED AND TEXTURED FLEXIBLE MATERIALS

BACKGROUND OF THE INVENTION

The present invention relates to a process for repairing vinyl base material such as automotive upholstery and vinyl tops.

Vinyl materials have become extremely popular for use in automobiles, home furnishings and the like. The surface of vinyl materials can be textured to simulate almost any pattern desired. An example of this is simulated leather upholstery.

Vinyl materials can be damaged by cigarette burns, knife cuts, tears, splits and the like.

U.S. Pat. No. 3,620,865 describes a process for repairing flexible vinyl materials by applying thin layers of a clear liquid vinyl-welding compound to the hole in a damaged vinyl base material. Each layer is cured in the hole and fused to the adjacent vinyl base material by application of heat. The top layer and the adjacent surface of the vinyl base material are grained by heating the area to soften it, applying a graining tool having the grain pattern of the damaged base material on the die face to the softened area, maintaining the graining tool on the softened area under a slight pressure, and then cooling the grained area while maintaining a slight pressure to allow the grained softened area to harden. The graining tool is made from an opaque graining compound containing polyester resin, calcium carbonate, and talc. This opaque material is poured onto vinyl having the grain or surface texture of the piece being repaired and allowed to set up. Color is applied to the repaired area with a vinyl color spray so that it will match the vinyl base material.

Although this process has proven to be successful, it is not without disadvantages. Among the disadvantages is that the vinyl color spray easily wears off the surface of the repair, thereby leaving the non-pigmented welding compound material visible. Attempts to overcome this problem by pigmenting the welding repair material to match the vinyl base material have generally been unsatisfactory because when the vinyl repair material matches the vinyl base material, it is very difficult to ascertain whether the repair material has fused into the vinyl base material. Therefore, inadequate fusion often occurs resulting in a very weak repair.

Another disadvantage with this process is that the graining tool is opaque and it is very difficult to index the dye surface of the graining tool with the grain pattern of the vinyl base material so that the grain in the repaired area blends in and matches the grain of the base material. Furthermore, the polyester resin used for the graining tool degrades at the temperature at which the vinyl base material and the vinyl-welding compound soften. Thus it is necessary to preheat the repair before applying the graining tool which is a time consuming procedure. A quicker repair occurs with heat applied directly through the graining tool to the repaired area.

SUMMARY OF THE INVENTION

The present invention envisions alternately layering and curing vinyl material in a prepared area of a damaged vinyl article with only the last layer pigmented to match the article. Any texturing of the last layer is with a transparent texturing tool with the grain being indexed. Preferably, heat softening of the top layer is through the tool.

In a detailed form of the present invention, layers of a welding compound are applied in a prepared hole in a damaged vinyl base material. Each layer is cured and fused to the base before the next layer is applied. All but the last layer of welding compound contrasts with the color of the vinyl base material so that the blurring of the demarcation between the layer and the base is used to be sure that fusion has occurred. The initial layer is applied over a backing material, for example, the roof of an automobile in the case of a repair to a vinyl top, or sponge rubber, in the case of a repair to an automobile seat. Each layer cools before a subsequent layer is applied. The welding compound used for the final layer is pigmented to match the color of the vinyl base material being repaired. Before curing the final layer, its surface is leveled to present a continuous surface with the vinyl base material being repaired. After leveling, the last layer is cured and fused to the base material.

When texturing the repair is necessary, the surface of the cured last repair layer and the surrounding area are heated. While the surface is warm, a tool transparent to a textured die face is applied to the surface under pressure. The texture on the die face is indexed or registered to the pattern of the vinyl base material through the tool. Preferably, the surface area of the die is sufficiently large to feather the surface of the base material proximate the repair. The affected surface is cooled before removal of the tool as by cooling the tool with a wet cloth or sponge.

A texturing tool may be made from a heat resistant material and heat applied directly to and through the tool by a device such as a home electric iron.

The process of the present invention provides an expedient and inexpensive way of repairing flexible vinyl materials which have been damaged as by ripping, tearing, burns, or the like. The repair is strong and long lasting, because it is easy to insure that the vinyl welding compound is completely fused into the vinyl base material. The process produces a repair which is essentially identical in appearance to the vinyl base material being repaired, because the top layer is pigmented and textured to match the vinyl base material. Furthermore, wear of the top layer does not adversely affect the appearance of the repair because the color is not just a surface spray of vinyl color, but rather an integral part of the top layer.

These and other features, aspects, and advantages of the present invention will become more apparent from the following description, appended claims, and drawings.

DESCRIPTION OF THE PREFERRED EMBODIMENTS

Figure 1:
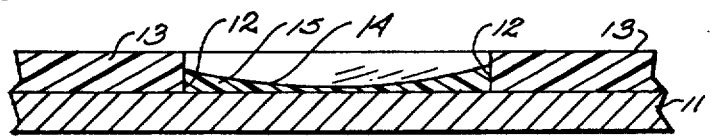
FIG. 1 depicts a layer of weld compound applied in a repaired hole of a flexible vinly material such as a vinyl top on an automobile roof.
Figure 2:
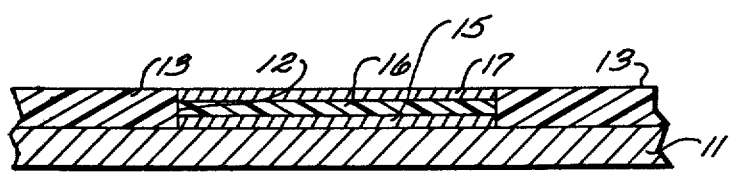
FIG. 2 is a view similar to FIG. 1 showing the repair after all the layers of welding compound have been applied.
Figure 3:
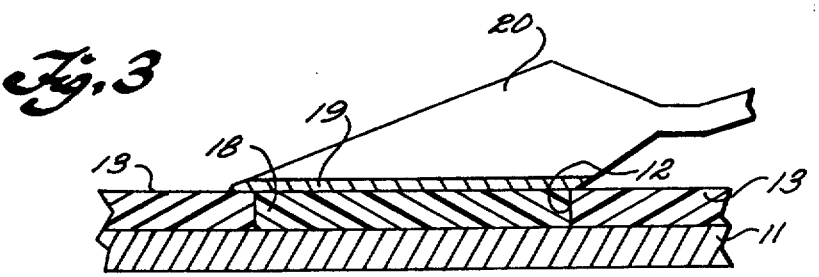
FIG. 3 is a view showing the finishing of a repair.

The process of the present invention contemplates the preparation of a damaged area in a vinyl base material by removing loose, damaged and frayed vinyl base material. This can be done with a sharp instrument such as a knife or razor blade. The object is to get a clean and sharp edge bounded on one side by the area to be repaired and on the other with undamaged vinyl. In the event that the repair is to a razor-type cut, the cut or slit is opened by cutting a little base material away to develop a wider slit, for example, about a one-sixteenth of an inch. This provides room for the vinyl welding compound, hereinafter described, and insures a strong fusion bond between the welding compound and the base material being repaired.

Further preparation of the joint may be required where the vinyl material is glued to a substrate such as a car roof. Glue adversely affects the vinyl-welding material by causing it to crack. Therefore, any regluing which must be done to the vinyl base material should be done without allowing glue to get onto the substrate over which the vinyl-welding material is to be applied or on the peripheral edge of the hole.

In order to obtain satisfactory fusion between the vinyl-welding compound and the base material being repaired, it is necessary that the vinyl base material defining the repair hole or slit be thoroughly cleaned. This may be done with any good quality solvent such as toluol which will remove grease and the like to present a clean vinyl surface without leaving a residue. In addition to grease removal, it is preferred that a mild vinyl solvent be used to clean a small film of vinyl off the area of the base material bounding the repair hole to be sure that all foreign matter is removed. The removal of foreign matter from the surface of the vinyl base material bounding the hole is necessary if edge lifting is to be avoided.

After the area of the surface of the vinyl material to be repaired has been thoroughly cleaned, it must be dry. Drying may be done by wiping the solvent cleaners away and by the application of heat as from a commercially available heat gun.

The vinyl-welding compound used in repairing a damaged vinyl article is a vinyl compound having a high tensile strength relative to the vinyl base material but with a fusion point compatible with the base material. The requirement of a low fusion point is necessary to prevent damage to the base material during the curing of the welding compound. The following table shows satisfactory ingredients for a welding compound. The amounts are for a 90-gallon batch.

TABLE 1

|  |  | Parts by Weight |
|---|---|---|
| Diamond PVC 7401 | 360 lbs. | 0.445 |
| Diamond PVC 71 | 120 lbs. | 0.150 |
| Diisodecyl phthalate (DIDP) | 320 lbs. | 0.395 |
| Ferro 1777 | 3,600 grams | 0.010 |

Diamond PVC 7401 has a low fusion temperature and relatively low tensile strength. The addition of Diamond PVC 71 to PVC 7401 increases tensile strength but also increases the fusion temperature. Diamond PVC 7401 is a copolymer of vinyl chloride and polyvinyl acetate manufactured by the dispersion method. Diamond PVC 71 is a homopolymer of polyvinyl chloride manufactured by the dispersion method which has a fusion temperature of from between about 325° to 350° F. The balance shown in the table has proven highly satisfactory in accommodating both the requisites of tensile strength and fusion temperature.

The diisodecyl phtholate is used to increase the flexibility of the welding compound. If too much of this plasticizer is used, the welding compound loses desirable tensile strength. The ferro 1777 is a stabilizer. It is a calcium-zinc organic inhibitor. The composition set forth above is a thermoplastic and thermosetting material which must be cured.

The compositions set forth above are clear, but pigments suitable for vinyl compounds and well known to the art may be added to the composition to give it any desired color.

The composition set forth above is a thermoplastic and thermosetting material which must be cured.

It has been found that if this composition is too thick, effective curing is impossible without damaging the vinyl base material. This is so because the amount of heat required to cure the welding compound, when the latter is thick, damages the vinyl base material surrounding the welding compound. Stated alternatively, with the low heat flux required to prevent damage to the vinyl base material, only the surface of a thick layer of weld compound would be cured.

As a consequence, the process of the present invention contemplates that the weld compound be layered into the hole in the vinyl base material and cured after each layer has been applied. Generally speaking, with most vinyl base material thicknesses, four layers are satisfactory. The first layer must, of course, be backed in order to prevent the compound from sagging through the hole. Normally the backing is provided by seat cushion material, or in the case of vinyl tops, the steel automobile roof. If it is not, then some form of backing must be used. Thus, when the sponge rubber used in many automobile upholstery applications is split in the area to be fixed, the sponge rubber split is filled with, for example, cotton.

Another consideration should be observed if grain flattening of the vinyl base material is to be avoided in situations where the substrate absorbs considerable amounts of the heat applied during curing. This situation occurs, for example, in vinyl top repairs where the steel substrate absorbs and retains curing heat applied with a heat gun during sectioning. This applied heat causes the grain of the base material to flatten. To prevent this, an insulating layer of, say cardboard, should be placed between the metal and welding compound.

Each layer of welding material may be applied to the cutout hole as shown schematically in the Figures. The Figures illustrate a substrate or backing 11, for example a car roof, a prepared hole 12, and a vinyl base material 13 overlying the substrate and bounding hole 12. An initial layer 15 is laid over substrate 11 with, for example, a pallet knife. This initial layer should be worked around the lower edges of the vinyl base material surrounding the repaired hole. A fillet 16 is developed between the wall of hole 12 and the balance of the first layer. Care should be taken to remove all excess welding compound material from the upper or top surface of the vinyl base material before the cure of the initial layer to prevent roughness on the vinyl base material surrounding the repair.

The initial layer is cured as by a heat gun. This layer must be cured properly for a strong weld. With the welding compound specifically discussed above and described in Table 1, the cure is complete when the weld material becomes clear. This initial layer is also fused with the vinyl base material by the application of the heat until complete fusion results. Because the weld compound is either clear or colored different from the vinyl base material, it is possible to actually see the complete fusion taking place by the disappearance of the sharp line of demarcation. Therefore, the demarcation shown in the FIGS. is not actually present in a fused repair.

After curing, the layer is allowed to cool for the application of the intermediate layers. This may be done by cold water on a wet cloth. One or more intermediate layers 16 are applied exactly as the initial layer. The intermediate layers are worked around the edges of the vinyl material defining the hole and are applied thinly in order to have an effective cure. Sufficient heat is applied to completely fuse the vinyl welding compound into the surrounding vinyl base material.

Final layer 17 is made from the same welding compound used for the initial and intermediate layers, with the addition of from about 1% to about 5% by weight of pigment. The pigment is chosen so that the welding compound will match the color of the vinyl base material. For example, it has been found that for most black vinyl materials, such as those used for black vinyl couches, Columbian Carbon Black Raven 30 made by Cities Service Company of Atlanta, Georgia is satisfactory.

Final layer 17 is applied in the same way as the initial and intermediate layers, but its surface is smoothed and leveled flush with the upper surface of the vinyl base material before curing with a pallet knife or similar device. After it is leveled, the upper surface is cured and fused to the vinyl base material, again by the application of heat. Again, it should be emphasized that the repair after curing is fused with the vinyl base material, and therefore, the illustrated distinctive boundary between the two is not in fact present.

Generally, the grain or surface texture of the vinyl base material must be duplicated in the exposed surface of the cured welding compound. This is done by a texturing tool 19, usually for graining, hence a graining tool. The tool is applied to a heated and softened surface of the cured weld compound and adjacent vinyl base material.

The graining tool is made with a relatively hard, but yet flexible material which has a die surface with the impression of the grain pattern desired. The graining tool is made from a transparent material so that the grain pattern or surface texture of the vinyl base material may be seen through it. This facilitates indexing of the graining tool when it is applied to the repaired area, using the process described below.

A graining tool fabricated from Reichold Polylite Polyester Resin 32-359 is effective. This material has a very good curing rate with a gell time of 5-7 minutes when 1.0% (by weight resin) methyl ethyl ketone peroxide is used as a catalyst. Both the resin and catalyst may be obtained from Reichold Chemicals, Inc., of White Plains, New York. This polyester does not adhere to either the vinyl base material or the vinyl welding compound. The cured polyester is resilient and hard, but sufficiently flexible to duplicate the surface texture of the vinyl base material. The material, when cured, is clear.

Another material which is suitable for the graining tool is General Electric's RTV-615, a room temperature vulcanizing dimethyl silicone rubber. The preferred curing agent is General Electric's SRC-05 catalyst. The silicone rubber and catalyst are available from General Electric Company, Silicone Products Division, Waterford, N.Y. The silicone rubber is hard with a Shore durometer hardness of 35, but yet sufficiently flexible to take the impression of the surface texture of the vinyl base material. Because RTV-615 retains its elastomeric properties up to 400° F., heat can be directly applied to a graining tool fabricated from RTV-615 positioned on the surface of the cured vinyl welding compound. Because RTV-615 is clear, a graining tool fabricated from it easily is indexed with the surface pattern of the vinyl base material. A disadvantage of RTV-615 silicone rubber is that it has a comparatively lengthy cure time, requiring about 24 hours at room temperature and 15 to 30 minutes at 150° C. to cure. Thus, a graining tool made of RTV-615 usually is fabricated prior to beginning the rest of the repair process.

To fabricate graining tool 19, a mold release agent such as silicone is placed over the vinyl base material. One of the materials just described is poured on a flat, non-porous surface, and mixed with its catalyst. Catalyzed compound is then removed from the non-porous surface and applied over the area of the vinyl base material which has been coated with the silicone mold release. The catalyzed compound is then leveled with a spatula or similar device.

After the compound sets and hardens, it is peeled off the vinyl base material. The resulting graining tool has a die face with the impression of the surface of the textured vinyl base material.

The grain is applied by first softening the surface of the upper layer of the cured weld compound and the adjacent surface of the vinyl base material by heating it to a temperature of about 250° F. with a heat gun. Next, the graining tool pressure is applied with slight pressure to the heated area. The pressure is exerted with a pellet knife 20 or similar device.

Because the graining tool is made from clear material, it easily is registered or indexed with the repetitive pattern of the vinyl base material. After a small period of time, for example, five seconds, the pallet knife 20 is removed, the graining tool is cooled as by a wet cloth or sponge, and then the tool is removed.

Alternately, when the graining tool is made from a heat resistant material such as the silicone rubber described above, the softening of the weld and the vinyl base material may be done by applying heat directly through the graining tool with a device such as a home electric iron. This procedure eliminates the step of preheating the area to be grained.

The present invention has been described with reference to a preferred embodiment. The spirit and scope of the appended claims should not, however, necessarily be limited to this description.

What is claimed is:

1. A process for repairing damaged area in a pigmented vinyl base material comprising:
   a. preparing an area to be repaired in the vinyl base material by making a hole with a sharp, clean edge;
   b. cleaning the surface of the base material adjacent to the hole;
   c. drying the cleaned area;
   d. applying at least one layer into the hole, the layer being of a liquid vinyl-welding compound having a color contrasting with the color of the vinyl base material and having a fusion temperature about equal to that of the vinyl base material, and a high tensile strength relative to the vinyl base material;

e. applying one top layer into the hole, the top layer being of a liquid vinyl-welding compound pigmented to match the color of the vinyl base material, and having a fusion temperature about equal to that of the vinyl base material, and a high tensile strength relative to the vinyl base material;

f. working each layer before applying a successive layer around the edge of the hole to obtain intimate contact between the vinyl base material and the layers;

g. curing each layer and fusing each layer into the vinyl base material before applying a successive layer by the application of heat after each layer has been worked;

h. cooling each cured layer before applying a successive layer to prevent the premature curing of the successive layer; and i. leveling the last pigmented layer before it is cured to obtain a continuous surface between the vinyl base material and the last layer.

2. The process as claimed in claim 1 including the additional step of texturing the area defined by the pigmented cured last layer and the adjacent surface of the vinyl base material by:

a. heating the area to soften it;

b. applying a transparent texturing tool having the pattern of the vinyl base material in a die face thereof to the softened area, with the die face texture pattern in register with the textured pattern of the adjacent surface of the vinyl base material;

c. maintaining the texturing tool on the softening area under slight pressure to obtain a texture pattern therein which is feathered with the grain of the vinyl base material; and d. cooling the textured softened surface while maintaining the slight pressure with the texturing tool to allow the textured softened area to harden.

3. The process as claimed in claim 2 wherein the transparent texturing tool is made from a material selected from the group consisting of epoxy resin, polyester resin, and room temperature vulcanizing silicone rubber.

4. The process claimed in claim 1 including the additional step of graining an area defined by the pigmented cured last layer and the adjacent surface of the vinyl base material by:

a. applying a clear graining tool, able to resist temperatures of at least about 250° F. without degradation, to the area with the die face grain pattern in register with the grain pattern of the surface of the vinyl base material, the graining tool having the grain pattern of the vinyl base material in a die face thereof;

b. applying heat and slight pressure to the graining tool to soften the area and to obtain a grain pattern therein which is feathered with the grain of the vinyl base material; and c. cooling the grained softened surface while maintaining the slight pressure with the graining tool to allow the grained softened area to harden.

5. The process as claimed in claim 4 wherein the clear graining tool is made from a material selected from the group consisting of epoxy resin, polyester resin, and room temperature vulcanizing silicone rubber.

6. The process in claim 1 wherein the non-pigmented thermoplastic welding compound comprises, in parts by weight, about 0.445 parts of a copolymer of vinyl chloride and polyvinyl acetate, about 0.150 parts of a homopolymer of polyvinyl chloride having a fusion temperature of from between about 325° to 350° F., about 0.395 parts diisodecyl phthalate, and minor amounts of a stabilizer.

7. The process claimed in claim 1 wherein the pigmented thermoplastic welding compound comprises, in parts by weight, about 0.445 parts of a copolymer of vinyl chloride and polyvinyl acetate, about 0.150 parts of a homopolymer of polyvinyl chloride having a fusion temperature of from between about 325° to 350° F., about 0.395 parts diisodecyl phthalate, minor amounts of a stabilizer, and from about 0.010 to about 0.050 parts pigment.

8. A process for repairing a damaged area in a vinyl base material comprising:

a. preparing an area to be repaired by removing damaged vinyl base material to obtain a sharp edge in the vinyl base material which defines an open hole;

b. cleaning the surface of the base material adjacent to the hole;

c. drying the cleaned area;

d. applying successive thin layers of a liquid vinyl-welding compound having a fusion temperature about equal to that of the vinyl base material and a high tensile strength relative to the vinyl base material into the hole;

e. working each layer around the edge of the hole to obtain intimate contact between the vinyl base material and the layers;

f. curing each layer by the application of heat after each layer has been worked;

g. cooling each cured layer before applying a successive layer to prevent the premature curing of the successive layer;

h. smoothing the last layer before it is cured to obtain a continuous surface between the vinyl base material and the last layer;

i. heating the surface of the cured last layer and the adjacent surface of the vinyl base material to soften it;

j. applying a clear graining tool having the grain pattern of the vinyl base material in a die face thereof to the softened area, with the die face grain pattern in register with the grain pattern of the adjacent surface of the vinyl base material;

k. maintaining the graining tool on the softened area under slight pressure to obtain a grain therein which is feathered with the grain of the vinyl base material; and l. cooling the grained softened surface while maintaining the slight pressure with the graining tool to allow the grained softened area to harden.

9. A process for repairing a damaged area in a vinyl base material comprising:

a. preparing an area to be repaired in the vinyl base material by making a hole with a sharp, clean edge;

b. cleaning the surface of the base material adjacent to the hole;

c. drying the cleaned area;

d. applying successive thin layers of a liquid vinyl-welding compound having a fusion temperature about equal to that of the vinyl base material and a high tensile strength relative to the vinyl base material into the hole;

e. working each layer around the edge of the hole to obtain intimate contact between the vinyl base material and the layers;

f. curing each layer by the application of heat after each layer has been worked;

g. cooling each cured layer before applying a successive layer to prevent the premature curing of the successive layer;

h. smoothing and leveling the last layer before it is cured to obtain a continuous surface between the vinyl base material and the last layer;

i. applying a clear graining tool able to resist temperatures of at least about 250° F. without degradation to the area with the die face grain pattern in register with the grain pattern of the surface of the vinyl base material, the graining tool having the grain pattern of the vinyl base material in a die face thereof;

j. applying heat and slight pressure to the graining tool to soften the area and to obtain a grain pattern therein which is feathered with the grain of the vinyl base material; and k. cooling the grained softened area while maintaining the slight pressure with the graining tool to allow the grained softened area to harden.

10. The process of claim 1 in which the step of applying a layer contrasting with color of the vinyl base material into the hole comprises applying a layer pigmented to contrast with the vinyl base material into the hole.

* * * * *